(12) United States Patent
Halme et al.

(10) Patent No.: US 7,384,701 B2
(45) Date of Patent: Jun. 10, 2008

(54) BIOCATALYTIC DIRECT ALCOHOL FUEL CELL

(75) Inventors: Aarne Halme, Espoo (FI); Matti Korhola, Helsinki (FI); Anja Appelqvist, Espoo (FI); Jussi Suomela, Espoo (FI); Xia-Chang Zhang, Espoo (FI)

(73) Assignee: Enfucell Oy, Espoo (FI)

( * ) Notice: Subject to any disclaimer, the term of this patent is extended or adjusted under 35 U.S.C. 154(b) by 631 days.

(21) Appl. No.: 10/463,344

(22) Filed: Jun. 18, 2003

(65) Prior Publication Data

US 2004/0048111 A1 Mar. 11, 2004

(30) Foreign Application Priority Data

Jun. 28, 2002 (FI) .................................. 20021285

(51) Int. Cl.
*H01M 8/16* (2006.01)
*H01M 4/90* (2006.01)

(52) U.S. Cl. ................. 429/2; 429/30; 429/43
(58) Field of Classification Search ............... 429/2, 429/30, 40, 43
See application file for complete search history.

(56) References Cited

U.S. PATENT DOCUMENTS 3,284,239 A * 11/1966 Hunger et al. ................. 429/2
6,270,649 B1 8/2001 Zeikus et al.
6,294,281 B1 9/2001 Heller
2002/0001739 A1 1/2002 Liberatore et al.
2004/0101741 A1* 5/2004 Minteer et al. ............... 429/43

FOREIGN PATENT DOCUMENTS

JP   2002270210 A  *  9/2002

OTHER PUBLICATIONS

Study of Biological Fuel Cells, Aarne Halme et al., pp. 1-10, Automation Technology Laboratory, Helsinki University of Technology.
Enzymatic Fuel Cell:Biochemical Energy Conversion, Anja Ranta et al., Helsinki University of Technology.
Monitoring And Control of a Bacteria Fuel Cell Process by Color Analysis, Aarne Halme et al., Automation Technology Laboratory, Helsinki University of Technology, 02150 Espoo, Finland.

* cited by examiner

*Primary Examiner*—Tracy Dove
(74) *Attorney, Agent, or Firm*—Young & Thompson

(57) ABSTRACT

The invention relates to a biocatalytic direct alcohol fuel cell comprising an anode chamber, one or more cathode chambers, and an ion exchange membrane between the chambers. The anode chamber contains a biocatalyst for oxidation of the fuel, and the cathode chamber contains a chemical catalyst, a biocatalyst or a combination thereof for reduction of oxygen or a corresponding oxidant.

20 Claims, 3 Drawing Sheets

BIOCATALYTIC DIRECT ALCOHOL FUEL CELL

BACKGROUND OF THE INVENTION

The invention relates to small-size fuel cells and particularly to biocatalytic direct alcohol fuel cells, referring to both hybrid and completely biocatalytic fuel cells. In a biocatalytic hybrid fuel cell, one of the anode or cathode chambers is substantially biocatalytic and the other chemical. Both parts of a completely biocatalytic fuel cell are substantially biocatalytic. More particularly, the invention relates to biocatalytic direct alcohol fuel cells, their use and a method of producing electric power using such a cell. The invention also relates to monitoring the state of such a fuel cell.

A biocatalytic fuel cell is a device that converts chemical energy directly to electricity. Suitable fuels, i.e. substrates, for cells of this type include different organic compounds, such as sugars and alcohols. The driving force of the cell is based on the redox reaction of the substrate when a live microorganism, cell-bound enzyme or isolated enzyme is used as catalyst. The operating principle of a biocatalytic cell is similar to that of a chemical fuel cell. The main difference is that the catalyst in a biological fuel cell is an enzyme (enzymes), and not a noble metal, such as platinum, and that the working conditions are mild. The temperature and pH of the solution are within the biological range, which refers to the operating conditions of the organism and enzyme(s).

Today, special attention is paid to energy sources that are suitable for portable, low-power electronic devices, such as mobile phones, computers, etc. The object is a better energy storage capacity and more environmentally friendly structural and material solutions than in batteries. Since the use of hydrogen as a fuel is not possible for safety reasons, direct-acting fuel cells (that work without a reformer) using logistic fuels have been the focus of interest. The drawback in chemical direct-acting fuel cells is that, to be powerful, they require intensive reaction conditions, such as a high temperature and strongly acidic or alkaline solutions. In most chemical fuel cells, an additional catalyst used is platinum or a platinum alloy, which is expensive and limitedly available. In addition, platinum is inactivated at very low carbon monoxide concentrations, carbon monoxide, in turn, being easily generated as a reaction product when any other fuel than pure hydrogen is used.

Biological fuel cells with an enzyme as the catalyst are previously known in the field. For instance, published U.S. Pat. No. 6,294,281 describes a biological fuel cell that uses human fluids or plant sap as the energy source and is therefore suitable for pacemakers implanted in a human, for example. According to the publication, an enzyme of a different type is disposed both on the anode and on the cathode.

US patent application publication 2002/0001739 discloses an electrically re-chargeable enzymatic battery. The fuel cell disclosed in the publication is not directly an alcohol fuel cell, but NADH (reduced nicotinamide adenine dinucleotide) is used as the fuel for providing the electrons. The enzyme, for instance dehydrogenases are mentioned as suitable, catalyzes the transfer of the electrons from the electron carrier, i.e. the NADH, to the mediator. Thus, the main reaction in the anode chamber is the oxidation of NADH. In addition, instead of the ion exchange membranes typically used in fuel cells, the publication employs a biologic proton pump, wherein the membrane is composed of a proton-transferring protein and the membrane is activated with a light diode.

Publication Enzymatic Fuel Cell: Biochemical Energy Conversion, Ranta, A., Zhang X-C. and Halme, A., Power Sources for the New Millenium, Proceedings of the International Symposium of ECS, 22-27.10.2000, Phoenix, USA, Proceedings Volume 2000-22, Ed. Ryan M. A. et al. The Electrochemical Society Inc., Pennington, USA, 2001, p. 108-117, discloses an enzymatic fuel cell, the fuel present in the anode chamber of the cell being subjected to enzymatic oxidation. The hydrogen ions, flowed through an ionselective membrane to the cathode chamber, react with atmospheric oxygen forming water. The enzyme is immobilized on the surface of the anode. Methanol can be used as the fuel in the cells, and either alcohol dehydrogenase or methanol dehydrogenase as the enzyme. The electrons released in the enzymatic reaction are transferred to the anode by means of the mediator. Phenazine methosulphate and phenazine ethosulphate are mentioned as suitable mediators.

Publication Study of Biological Fuel Cells, Halme, A., Zhang, X-C. and Ranta, A., Poster presentation at Small Fuel Cells 2000, New Orleans, USA, 26-28.4.2000, discloses an enzymatic fuel cell similar to the one in the above publication with the exception that the enzymatic oxidation of methanol takes place in the presence of coenzyme $NAD^+$ (nicotinamide adenine dinucleotide).

BRIEF DESCRIPTION OF THE INVENTION

The object of the invention was to provide an environmentally friendly and efficient energy source suitable for portable electronics devices, as an alternative to known cell structures, whereby the above problems can be avoided. The invention thus relates to a biocatalytic direct alcohol fuel cell comprising an anode chamber, one or more cathode chambers, and an ion exchange membrane between the chambers. The fuel cell of the invention is characterized in that the anode chamber contains a biocatalyst for oxidation of the fuel, and the cathode chamber contains a chemical catalyst, a biocatalyst or a combination thereof for reduction of oxygen or a corresponding oxidant.

The invention also relates to a method of producing electric power using the device of the invention. The method is characterized by oxidizing fuel in an anode chamber by using a biocatalyst, conveying the generated electrons to a current collector electrode by means of a mediator, and reducing oxygen or a corresponding oxidant in a cathode chamber by means of electrons originating from a current donor electrode and a chemical catalyst, a biocatalyst or a combination thereof.

The invention further relates to a method of monitoring the state of the fuel cell of the invention. The method is characterized by monitoring the color change of a liquid comprised by an anode chamber visually through one or more transparent walls of the anode chamber. The color change results from a change in the redox state of the mediator, based on which the performance of the anode reaction can be concluded.

The invention also relates to the use of the fuel cell of the invention for producing electrical power.

The structure of the fuel cell of the invention enables an optimally efficient oxidation reaction of the fuel and an anode current related thereto, and an optimally efficient reduction reaction of the oxidant and a cathode current related thereto. No separate fuel reforming is required.

A biocatalytic direct alcohol fuel cell is based on enzymatic degradation of the fuel in an anode compartment directly into electrons, protons, and other reaction products by means of a suitable enzyme or suitable enzymes. The basis of the efficient chemical operation of the cell is in a so-called triplet, which is composed of an enzyme, a mediator, and a stabilizer, and owing to which the electron transfer chain of the anode reactions operates reliably a long time in the generation of the output current. The mediator is a substance that oxidizes the enzyme, after which it itself oxidizes on the anode transferring the electrons released in the fuel decomposition reaction to a current collector. The stabilizer prevents the mediator from being inactivated, thus enhancing the electron transfer.

One of the advantages of the biocatalytic fuel cell is that platinum or platinum alloys, generally used as catalyst in chemical fuel cells, are not required. As portable electronic devices indisputably continue to become more common, problems caused by the recycling of conventional batteries are also avoided, since fuel cells are more durable and the materials contained therein are less burdening to the environment. They do not have to be classified as hazardous waste, as do batteries. In addition, materials are not used in a biocatalytic fuel cell that would have to be recovered after use and recycled for their value, such as platinum in chemical fuel cells.

BRIEF DESCRIPTION OF THE FIGURES

In the following, preferred embodiments of the invention will be described in detail with reference to the accompanying drawings, in which.

DETAILED DESCRIPTION OF THE INVENTION

Figure 1:
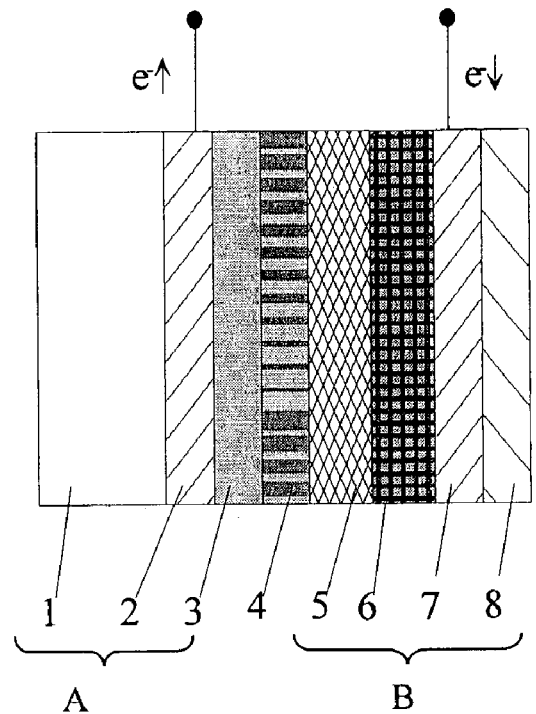
FIG. 1 shows the basic structure of the biocatalytic direct alcohol fuel cell of the invention.

With reference to FIG. 1, the biocatalytic fuel cell of the invention conventionally comprises an anode chamber A and a cathode chamber B and an ion exchange membrane 4 between them. The anode chamber comprises a fuel reservoir 1, a current collector electrode 2 and an electron conductor 3. The fuel reservoir contains not only fuel, but also a buffering agent and, in accordance with an embodiment of the invention, a biocatalyst, free in a liquid compartment. The cathode chamber comprises a compartment containing an electrolyte, an electron conductor 6 containing a catalyst, a current donor electron 7 and an oxygen-selective membrane 8.

Figure 2:
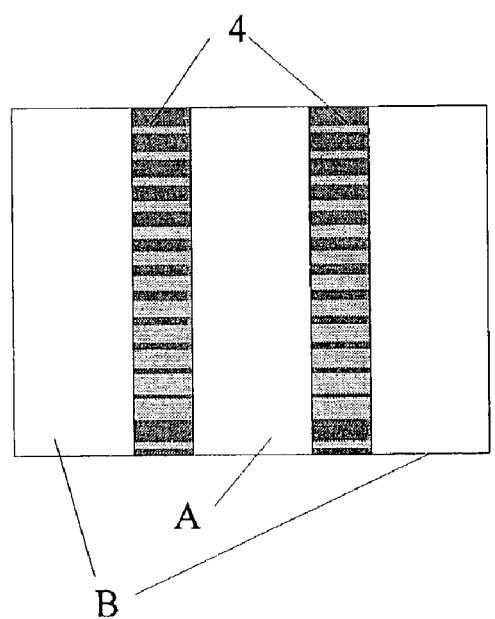
FIG. 2 shows an embodiment of the fuel cell of the invention, wherein the fuel cell comprises two cathode chambers.

FIG. 2 shows a preferred embodiment of the invention, the fuel cell comprising two cathode chambers B and one anode chamber A between them.

Figure 3:
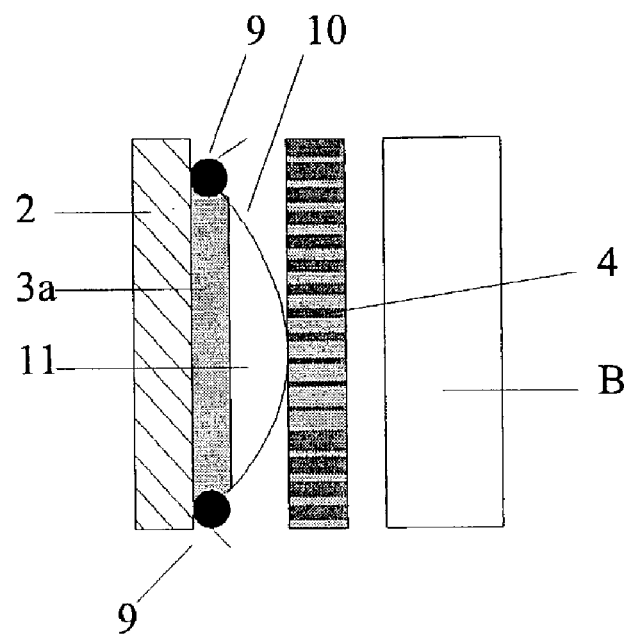
FIG. 3 shows an embodiment of the fuel cell of the invention, wherein the biocatalyst is entrapped onto the surface of the current collector electrode by means of a dialysis membrane.

In the fuel cell according to FIG. 3, the biocatalyst is entrapped into a compartment 11 by means of a dialysis membrane 10, which, in turn, is mechanically fixed onto the surface of the current collector electrode 2. Reference 9 denotes a seal. Reference 3a denotes a form of an electron conductor, wherein both a mediator and a stabilizer are blended into the electron conductor, i.e. the graphite coating.

Figure 4:
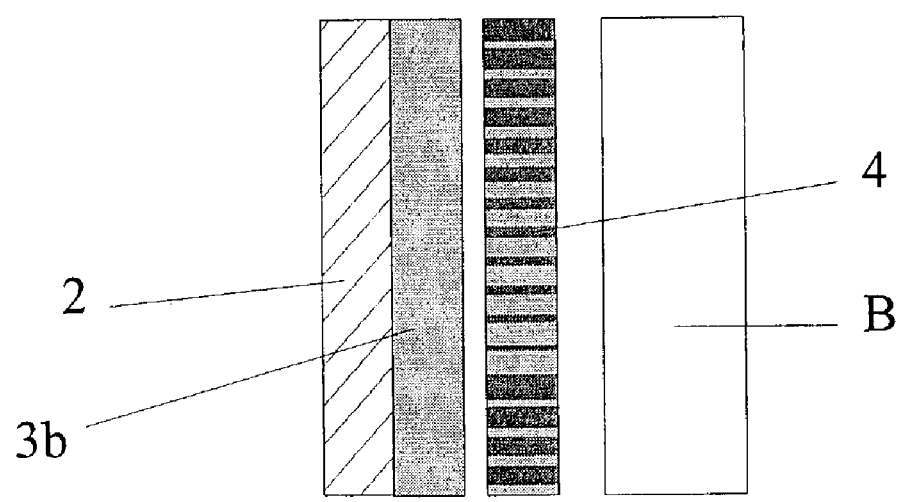
FIG. 4 shows an embodiment of the fuel cell of the invention, the enzyme, the mediator and the stabilizer being fixed onto the surface of the current collector electrode.
Figure 5:
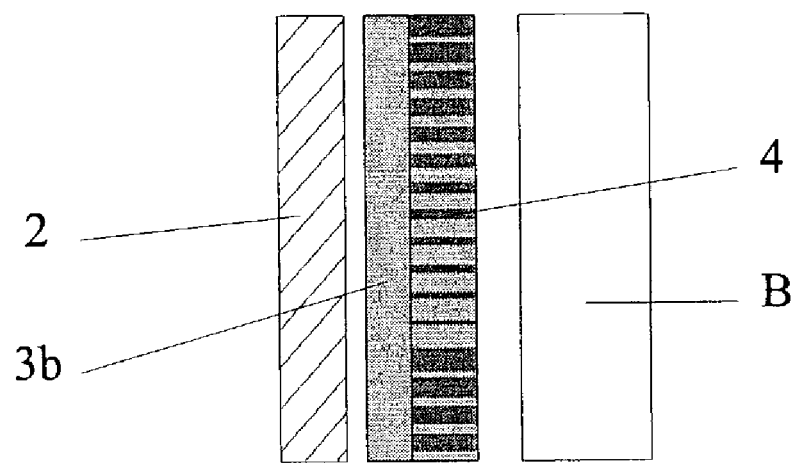
FIG. 5 shows an embodiment of the fuel cell of the invention, the enzyme, the mediator and the stabilizer being fixed onto the surface of an ion exchange membrane.

In FIG. 4, the triplet, i.e. the enzyme, the mediator and the stabilizer, is fixed onto the surface of the current collector electrode. Reference 3b denotes this embodiment, wherein the electron conductor, i.e. the graphite coating, contains both the enzyme, the mediator and the stabilizer. In FIG. 5, said triplet is fixed onto the surface of the ion exchange membrane 4.

Figure 6:
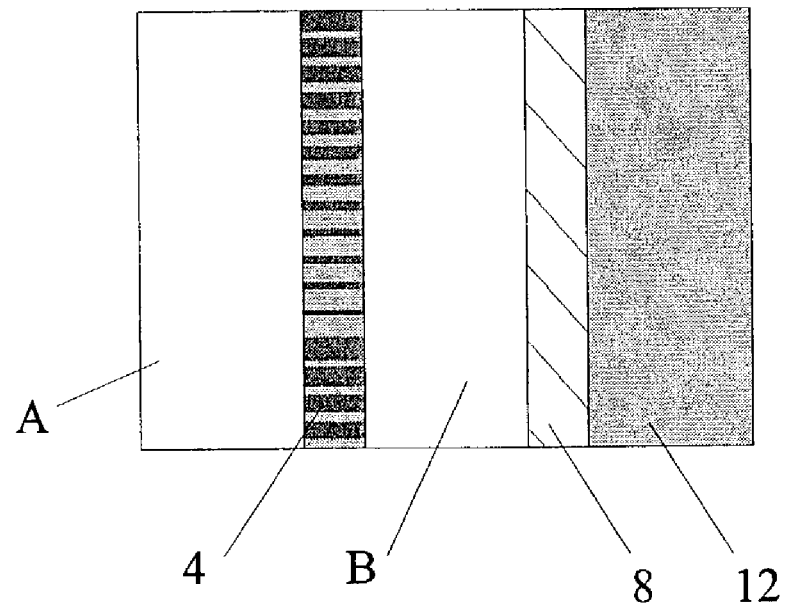
FIG. 6 shows an embodiment of the fuel cell of the invention, a closed oxygen supply being attached to the cathode chamber.

In FIG. 6, an atmospherically isolated oxygen supply 12, which is in communication with the cathode chamber through an oxygen-selective membrane 8, is attached to the cathode chamber B.

In the fuel cell of the invention, alcohol or an aqueous solution thereof is used as the fuel. These include particularly lower alcohols, such as methanol, ethanol and isopropyl alcohol or an aqueous solution thereof. Methanol is particularly useful owing to its large electron density.

In the fuel cell of the invention, the current collector electrode may be a graphite membrane, a carbon fabric or a metal net of nickel or stainless steel.

In the fuel cell of the invention, the possible biocatalysts include mainly enzymes. A special characteristic of biocatalysts is that they are enzymes functioning without a NADH co-factor (reduced nicotinamide adenine dinucleotide). In the anode chamber, particularly alcohol dehydrogenases are used as the enzyme, particularly PQQ (pyrroloquinoline quinone)dehydrogenases. The most useful enzymes are characterized by maintaining a high activity for a long time and remaining active at high alcohol concentrations (40 to 45%). When methanol is used as the fuel, the enzyme used is methanol dehydrogenase, whose producer strain is *Methylobacterium extorquens* (NCIMB 9133), previously *Pseudomonas AM*1, *Methylobacterium AM*1 and *Protomonas extorquens*, or *Acidomonas methanolica* (DSM 5432), i.e. *Acetobacter methanolicus*. In the cathode chamber, for instance laccase (polyphenol oxidase) can be used with a mediator, as is disclosed in publication Electroenzymatic reduction of dioxygen to water in the cathode compartment of a bio-fuel cell, Palmore, G. T. R. and Kim, H.-H., *J. Electroanal. Chem.* 464 (1999) 110-117.

The enzyme preparation is either a purified enzyme or a purified enzyme stabilized with known stabilizers (polyalcohols, polyelectrolytes, salts, etc.; published U.S. Pat. No. 6,133,229) or a cell-bound enzyme. The enzymatic catalyst may be present free in the fuel solution or it can be blended into the graphite coating or bound to the carrier by known methods, whereby the carrier may be any fixed structural part of the fuel cell or an added carrier substance.

The ion exchange membrane is any conventional proton exchange membrane having a low alcohol and mediator permeability and whose proton conductivity is good, such as cation exchange membrane No. 55165, manufactured by BDH Laboratory Supplies, UK.

As was stated above, in the fuel cell of the invention, electron transfer is enhanced with a mediator. In accordance with the invention, N,N,N',N'-tetramethyl phenylene diamine (TMPD) or as substance having the same properties is used, which constitutes a redox pair, which achieves the desired function. The mediator is not consumed in the reaction, but changes from one oxidation state to another. Several mediators, such as TMPD, are instable in aqueous solutions and oligomerize easily, causing the mediator to be inactivated. In the present invention, the inactivation is prevented by using a stabilizer that is a metal oxide or metal salt. Such are for instance $TiO_2$, $Al_2O_3$, $Fe_2O_3$ and $K_3Fe(CN)_6$. $TiO_2$ has proved to be the most efficient. The mediator and the stabilizer are blended into the graphite coating, which is then fixed onto the surface of either the current collector electrode or the ion exchange membrane.

Oxygen is diffused in the immediate vicinity of the current donor electrode contained by the cathode chamber at normal atmospheric pressure through an oxygen-permeable membrane. The cathode chamber contains either a solid or a liquid electrolyte. Oxygen reduction is catalyzed with a suitable catalyst, such as silver, or a biocatalyst fixed onto the surface of the current donor electrode by means of a conductive material, such as a graphite coating. When a biocatalyst is used, the coating also contains a mediator and a stabilizer. Instead of oxygen originating from the air, another oxidant can be used, such as hydrogen peroxide, which is stored in a separate closed container that is attached to the cathode chamber and is in communication with the cathode chamber through an oxygen-permeable membrane, as is shown in FIG. 6. A dry cathode may also be used, such as in generally known PEM fuel cells, in which case the chemical catalyst, the dry cathode and the current donor electrode are fixed together onto the surface of the ion exchange membrane such that the entity is in direct contact with air.

The total reaction of the fuel cell of the invention and the redox reactions of the different substances in the anode and cathode compartments are seen below. By way of example, the fuel is methanol and the reduced substance is oxygen in the air. MDH refers to methanol dehydrogenase.

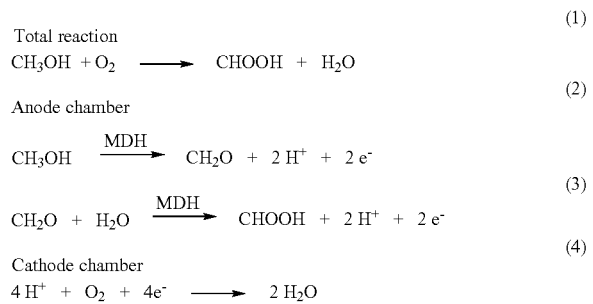

The fuel, pure alcohol or an alcohol-water mixture, is oxidized using an enzyme or enzymes in the anode compartment of the fuel cell. In the reaction, the end product produced is an aldehyde corresponding to the alcohol, which decomposes into an acid corresponding to the alcohol, and electrons and hydrogen ions. The reaction can be continued up to carbon dioxide with suitable enzymes, such as formiate-hydrogenlyase. The excessive lowering of the pH, caused by the acid formed in the reaction, is prevented by buffering. The electrons are conveyed to the current collector by means of the mediator, from where they are further transferred via an electric load to the cathode (when the cell is loaded). The reduced form of the mediator is thus oxidized on the current collector. The hydrogen ions are transferred through the proton exchange membrane to the cathode compartment, where they react with the oxidant and the electrons originating from the current donor. When the oxidant is oxygen of the air, water is generated as the reaction product.

The state of the biocatalytic fuel cell of the invention can be visually monitored on the basis of a color change in the reaction solution contained by the anode chamber. The invention also relates to this aspect. Monitoring is based on strong color changes of the mediator TMPD at different oxidation stages. When the activity of the enzyme starts to drop or the anode compartment no longer has fuel, blue, oxidized TMPD starts to accumulate in the anode compartment, since the enzyme is no longer capable of reducing it back to its colorless form. In this way, the state of the fuel cells can be easily observed visually through one or more transparent walls of the anode chamber. When the color of the cell is observed to turn into blue, the unit cell can be changed into a new cell containing fresh enzyme or add fuel to the cell.

The following examples describe the invention.

EXAMPLES

In all examples below, unless otherwise stated, the electrode in the cathode chamber was an oxygen diffusion electrode, manufactured by Gaskatel GmbH (Germany), with an area of 6 $cm^2$. The electrolyte in the cathode chamber was 0.18 M of a $KH_2PO_4$—$Na_2HPO_4$ buffer solution with a pH of 6.0. The volume of the cathode chamber was 1.5 ml and the volume of the anode chamber 7.2 ml. The ion exchange membrane used was a cation exchange membrane from the manufacturer BDH Laboratory Supplies, UK, No. 55165. Its area was 6 $cm^2$.

In examples 1 to 5, the enzymatic catalyst used was methanol dehydrogenase. In examples 1 to 3 and 5, its producer strain was *Methylobacterium extorquens* (NCIMB 9133) and in example 4 *Acidomonas methanolica* (DSM 5432).

Example 1

Enzymatic Catalyst Free in Fuel Solution

The current collector electrode of the anode chamber was of carbon fabric, graphite membrane or nickel net. The area of the electrode was 6 $cm^2$.

The anode chamber contained 0.18 M of a $K_2HPO_4$—NaOH buffer solution with a pH of 10, 2 IU of enzyme, 5 mM of TMPD, 0.2 mM of $TiO_2$, 45 mM of $NH_4Cl$ and ~1% methanol.

Reference Example 2

Enzyme Catalyst Fixed with Agarose onto the Surface of a Current Collector

The current collector electrode was of carbon fabric or graphite membrane. The area of the electrode was 6 $cm^2$.

In order to fix the enzyme, a buffer solution containing 10 ml of agarose was prepared, containing 0.6 M of a Tris-HCl buffer solution (pH 9.4), 2 g (20% weight/volume) graphite powder, 5 mM TMPD, 0.2-0.3% agarose and 4 IU enzyme. 5 ml of the prepared solution was applied onto the carbon fabric and the remaining 5 ml onto the graphite membrane.

The anode chamber contained 0.18 M of a $K_2HPO_4$-NaOH buffer solution with a pH of 10, 2 IU enzyme, 5 mM TMPD, 45 mM $NH_4Cl$ and 1% methanol, but no $TiO_2$.

Example 3

Enzyme Catalyst Blended into an Oil-Based Graphite Coating

The current collector electrode was of nickel net and its area was 6 cm². The graphite coating, containing the enzyme, was prepared by mixing 0.5 g graphite powder with paraffin oil. 2 IU enzyme, 15 mg TMPD and 0.15 mg of $TiO_2$ were added to the mixture. The coating was applied onto the nickel net and separated from the fuel buffer solution of the anode chamber with a dialysis membrane (12000-14000 dalton).

The anode chamber contained 0.18 M of a $K_2HPO_4$—NaOH buffer solution with a pH of 10, 45 mM $NH_4Cl$ and 1% of methanol.

Example 4

Cell-Bound Enzyme Catalyst Free in Solution

The current collector electrode was of nickel net and its area was 6 cm².

The enzyme used was not isolated from the producer cells. The reaction solution of the anode chamber was prepared by mixing 4 ml of a cell-bound enzyme (2 IU) in a $KH_2PO_4$—$Na_2HPO_4$ buffer solution (pH 6.0), which contained TMPD, $TiO_2$, $NH_4Cl$ and methanol. The final composition of the solution was 2 IU cell-bound enzyme, 1% methanol, 5 mM TMPD, 0.2 mM $TiO_2$ and 0.45 mM of $NH_4Cl$ in 0.18 M of a $KH_2PO_4$—$Na_2HPO_4$ buffer solution with a pH of 6.0.

Example 5

Enzyme Catalyst Blended into a Gelatin-Based Graphite Coating

The current collector electrode was of nickel net and its area was 6 cm².

The enzyme-containing graphite coating was prepared by mixing 0.5 g of graphite powder into a 1-percent (weight/weight) gelatin solution containing 2 IU enzyme, 15 mg TMPD and 0.15 mg $TiO_2$. The coating was applied onto the nickel net and separated from the fuel-buffer solution in the anode chamber with a dialysis membrane (12000-14000 dalton).

The anode chamber contained 0.18 M of a $K_2HPO_4$—NaOH buffer solution with a pH of 10, 45 mM of $NH_4Cl$ and 1% of methanol.

The fuel cells according to the above examples were used to measure the maximum open circuit voltage (max. open), power (P), current (I) and inner resistance ($R_{in}$) after a two-hour load, the load being 100 Ω. The results are shown in the table below.

|  | Example 1 | Ref. example 2 | Example 3 | Example 4 | Example 5 |
|---|---|---|---|---|---|
| Max. open (mV) | 320-360 | 250-270 | 420-500 | 380-420 | 350-400 |
| P (uW) | 60-140 | 30-80 | 260-480 | 140-230 | 100-200 |
| I (mA) | 0.8-1.2 | 0.5-0.9 | 1.6-2.2 | 1.2-1.5 | 1.0-1.4 |
| $R_{in}$ (ohm) | 190-290 | 200-370 | 120-200 | 160-210 | 180-240 |

The above results are measured with fuel cells having one cathode chamber and one anode chamber. The results show that the best results are obtained with solutions according to examples 3 and 4. Similar results are obtainable with fuel cells according to the invention, comprising two cathode chambers and one anode chamber.

It is obvious to a person skilled in the art that as technology advances, the basic idea of the invention can be implemented in a variety of ways. The invention and its embodiments are thus not limited to the above examples, but may vary within the claims.

The invention claimed is:

1. A biocatalytic direct alcohol fuel cell comprising an anode chamber, one or more cathode chambers, and an ion exchange membrane between the anode chamber and the one or more cathode chambers, wherein the anode chamber contains a biocatalyst for oxidation of a fuel, a mediator, and a metal oxide or a metal salt as a stabilizer, and the one or more cathode chamber contains a chemical catalyst, a biocatalyst or a combination thereof for reduction of oxygen or for reduction of an oxidant.

2. The fuel cell as claimed in claim 1, wherein the fuel cell comprises two cathode chambers.

3. The fuel cell as claimed in claim 1, wherein the biocatalyst contained by the anode chamber is an enzyme without a NADH co-factor.

4. The fuel cell as claimed in claim 3, wherein the enzyme is an alcohol dehydrogenase.

5. The fuel cell as claimed in claim 1, wherein the anode chamber further contains fuel, a buffering agent, a current collector electrode, and electron conductor.

6. The fuel cell as claimed in claim 5, wherein the fuel is a lower alcohol or an aqueous solution thereof.

7. The fuel cell as claimed in claim 1, wherein the mediator is N,N,N',N' tetramethyl phenylene diamine.

8. The fuel cell as claimed in claim 5, wherein the current collector electrode is a nickel or steel net or a graphite membrane.

9. The fuel cell as claimed in claim 5, wherein the electron conductor is a graphite coating containing fine-grained graphite powder and a binder.

10. The fuel cell as claimed in claim 5, wherein the electron conductor is a graphite coating, and wherein the biocatalyst is free in the fuel or the biocatalyst is mechanically entrapped onto a surface of the current collector electrode with a dialysis membrane, and the mediator and the stabilizer are attached to a surface of the current collector electrode by the graphite coating, or the biocatalyst, the mediator and the stabilizer are fixed onto the surface of the current collector electrode by the graphite coating, or the biocatalyst, the mediator and the stabilizer are fixed onto the surface of an ion exchange membrane by the graphite coating.

11. The fuel cell as claimed in claim 10, wherein the biocatalyst is mechanically entrapped onto the surface with a dialysis membrane, and the mediator and the stabilizer are fixed onto the surface of the current collector electrode by means of a graphite coating, or the biocatalyst, the mediator and the stabilizer are fixed onto the surface of the current collector electrode by means of a graphite coating.

12. The fuel cell as claimed in claim 1, wherein the one or more cathode chambers contain a chemical wet cathode, wherein the chemical catalyst is fixed onto a surface of a current donor electrode by means of a conductive material and a liquid electrolyte, and the oxygen flows into the one or more cathode chambers from atmospheric air through an oxygen-permeable membrane.

13. The fuel cell as claimed in claim 1, wherein the one or more cathode chambers contain a solid electrolyte and a chemical dry cathode, whereby the chemical catalyst, the dry cathode and a current donor electrode are fixed together onto the surface of the ion exchange membrane, and the fuel cell is in direct contact with air.

14. The fuel cell as claimed in claim 1, wherein the oxygen required for a cathode reaction is a non-atmospheric chemical form of oxygen, the chemical being stored in a separate closed reservoir attached to the one or more cathode chambers, the reservoir being in communication with the one or more cathode chambers through an oxygen-permeable membrane.

15. A method of producing electrical power with a device as claimed in claim 1, comprising:
    oxidizing fuel in an anode chamber by using a biocatalyst;
    conveying the generated electrons to a current collector electrode by means of a mediator; and
    reducing oxygen or a corresponding oxidant in a cathode chamber by means of electrons originating from a current donor electrode and a chemical catalyst, a biocatalyst or a combination thereof.

16. A method of monitoring the state of a fuel cell as claimed in claim 1, comprising:
    monitoring the color change of a liquid comprised by an anode chamber visually through one or more transparent walls of the anode chamber.

17. The fuel cell as claimed in claim 1 wherein the fuel cell in use produces electrical power.

18. The fuel cell as claimed in claim 12, wherein said chemical catalyst is silver and said conductive material is a graphite coating.

19. The fuel cell as claimed in claim 1, wherein the metal oxide or metal salt is selected from the group consisting of $TiO_2$, $Al_2O_3$, $Fe_2O_3$ and $K_3Fe(CN)_6$.

20. A biocatalytic direct alcohol fuel cell comprising:
    an anode chamber;
    at least one cathode chambers; and
    an ion exchange membrane between the anode chamber and the at least one cathode chamber, wherein,
    the anode chamber comprises an enzyme for oxidation of a fuel, a mediator that transfers electrons released during oxidation to enhance electron transfer, and a metal oxide stabilizer or a metal salt stabilizer that prevents inactivation of the mediator to further enhance electron transfer, and
    the at least one cathode chamber comprises at least one of a chemical catalyst and a biocatalyst for reduction of oxygen or an oxidant.

* * * * *